(12) United States Patent
Sasanuma et al.

(10) Patent No.: US 8,064,113 B2
(45) Date of Patent: Nov. 22, 2011

(54) DISPLAY APPARATUS, DISPLAY METHOD, AND CONTROL PROGRAM

(75) Inventors: Nobuatsu Sasanuma, Abiko (JP); Tomohisa Itagaki, Abiko (JP); Miyoko Hayashi, Fuchu (JP); Masami Tomita, Matsudo (JP); Toshio Saishoji, Fuchu (JP); Satoshi Takayama, Chofu (JP)

(73) Assignee: Canon Kabushiki Kaisha (JP)

(*) Notice: Subject to any disclaimer, the term of this patent is extended or adjusted under 35 U.S.C. 154(b) by 729 days.

(21) Appl. No.: 11/669,298

(22) Filed: Jan. 31, 2007

(65) Prior Publication Data

US 2007/0177237 A1 Aug. 2, 2007

(30) Foreign Application Priority Data

Jan. 31, 2006 (JP) ................. 2006-023625

(51) Int. Cl.
*G03F 3/08* (2006.01)
(52) U.S. Cl. .................. 358/518; 358/1.9; 358/520
(58) Field of Classification Search ............ 358/518, 358/1.9, 520
See application file for complete search history.

(56) References Cited

U.S. PATENT DOCUMENTS

| | | | |
|---|---|---|---|
| 3,504,980 A | 4/1970 | Bentley et al. | |
| 5,990,890 A | 11/1999 | Etheredge | |
| 6,486,923 B1 * | 11/2002 | Maeshima et al. | 348/649 |
| 7,688,326 B2 | 3/2010 | Cho et al. | |
| 2002/0036787 A1 | 3/2002 | Kondo | |
| 2003/0048464 A1 * | 3/2003 | Yamada et al. | 358/1.9 |
| 2003/0184557 A1 | 10/2003 | Wen | |
| 2004/0135782 A1 | 7/2004 | Marais | |
| 2005/0041015 A1 | 2/2005 | Kohda et al. | |
| 2005/0083346 A1 | 4/2005 | Takahashi et al. | |
| 2005/0094170 A1 * | 5/2005 | Ichitani | 358/1.9 |
| 2006/0082594 A1 | 4/2006 | Vafiadis et al. | |

FOREIGN PATENT DOCUMENTS

| | | |
|---|---|---|
| EP | 1 291 822 A2 | 12/2003 |
| JP | 5-231941 A | 9/1993 |
| JP | 6-035641 A | 2/1994 |
| JP | 9-219756 A | 8/1997 |
| JP | 2001-075692 A | 3/2001 |
| JP | 2003-099717 A | 4/2003 |
| JP | 2005-91005 A | 4/2005 |
| JP | 2005-100353 A | 4/2005 |

OTHER PUBLICATIONS

Related co-pending U.S. Appl. No. 11/669,358; Tomohisa Itagaki et al.; "Color Difference Display Control Apparatus, Color Difference Display Control Method, and Control Program", filied Jan. 31, 2007; Spec. pp. 1-43; Figs. 1-19.

(Continued)

*Primary Examiner* — Twyler Haskins
*Assistant Examiner* — Michael Burleson
(74) *Attorney, Agent, or Firm* — Rossi, Kimms & McDowell LLP

(57) ABSTRACT

This invention provides a display apparatus, control method, and control program, which display hue differences and color difference values of respective patches as lists, and display the hue direction of the hue difference of each individual patch on a chromaticity diagram in an easy-to-understand manner. To accomplish this, a display method of this invention includes a specifying step of specifying a color determined by a hue difference calculated from first and second values associated with spectral reflectance characteristics, and a display step of displaying the color specified in the specifying step as a graphical object. The specified color is specified as a representative color that indicates a hue on a chromaticity diagram to which the hue difference biases.

6 Claims, 12 Drawing Sheets

OTHER PUBLICATIONS

IMATEST; "Colorcheck: color accuracy and tonal response"; Internet Article, XP002432765; Aug. 28, 2005; retrieved from the Internet URL:http://web.archive.org/web/20070509105942:http://www.imatest.com/docs/print_tour_colorcheck.html>; retrieved on May 9, 2007.

Relevant Portion of Extended European Search Report issued in corresponding European Patent Application No. 07101168.8-2217, dated Jun. 1, 2007.

The MathWorks Inc.; Getting Started with MATLAB, version 7 2004; Cited in office action issued in related co-pending U.S. Appl. No: 11/669,358, filed Apr. 2, 2009.

Office Action issued in corresponding Japanese Patent Application No. 2006-023624 dated Feb. 22, 2010. Cited in related co-pending U.S. Appl. No. 11/669,358.

EP Office Action cited in corresponding European patent application No. 07101168.8, issued Sep. 7, 2011.

* cited by examiner

FIG. 4

| LGOROWL | 5 ~401 | | | | | | | |
|---|---|---|---|---|---|---|---|---|
| CREATED | 4 / 14 / 2005 # Time : 15 : 33 ~402 | | | | | | | |
| INSTRUME | Spectrolino | | | | | | | |
| MEASURE | EmissionObserverAngle=2–WhiteBase=AbsFilter=No | | | | | | | |
| KEYWORD | SampleID | | | | | | | |
| KEYWORD | SAMPLE_NAME | | | | | | | |
| NUMBER_ | 10 ~403 | | | | | | | |
| BEGIN_DATA_FORMAT | | | | | | | | |
| SampleID | RGB_R | RGB_G | RGB_B | XYZ_X | XYZ_Y | XYZ_Z | LAB_L | LAB_A | LAB_B |
| | | | | | | | | 404 | |
| END_DATA_FORMAT | | | | | | | | | |
| NUMBER_ | 40 ~405 | | | | | | | 406 | |
| BEGIN_DATA | | | | | | | | | |
| 1A | 0 | 0 | 0 | 0.45 | 0.39 | 0.49 | 3.55 | 2.98 | −3.07 |
| 2A | 128 | 0 | 0 | 11.12 | 6.23 | 0.99 | 29.99 | 45.12 | 33.52 |
| 3A | 255 | 0 | 0 | 37.98 | 20.9 | 2.35 | 52.84 | 69.81 | 57.64 |
| 4A | 255 | 0 | 255 | 52.89 | 28.15 | 81.58 | 60.03 | 81.6 | −68.18 |
| 5A | 255 | 153 | 204 | 58.53 | 47.79 | 58.9 | 74.69 | 32.43 | −22.39 |

DISPLAY APPARATUS, DISPLAY METHOD, AND CONTROL PROGRAM

BACKGROUND OF THE INVENTION

1. Field of the Invention

The present invention relates to a display apparatus, display method, and control program, which are used to evaluate color reproducibility.

2. Description of the Related Art

Various image output apparatuses such as printers, facsimiles, monitors, and the like, which handle color images are desired to have uniform color reproducibility in themselves. In order to attain uniform color reproducibility among various image output apparatuses, color evaluation and correction have been conducted for output results.

Japanese Patent Laid-Open No. 2005-91005 discloses a color evaluation apparatus which individually performs color evaluation in specific color regions. Especially, the invention of patent reference 1 performs color evaluation for respective individual regions such as a skin color region, red region, green region, blue region, and the like. Patent reference 1 adopts a method of displaying color difference values in patch icons.

Japanese Patent Laid-Open No. 5-231941 discloses a technique which represents hue biases by displaying hue differences calculated from measured data on coordinates upon comparing measured data of printed materials printed by a device and previously measured data.

However, these prior arts suffer from the following problems. In the output format that displays color difference values in display regions of patch icons, since the color difference values are expressed by absolute values, the hue direction of the color difference value of each individual patch on a chromaticity diagram cannot be expressed. Also, in the output format that displays the hue differences on the coordinates, a list of hue differences for all patches cannot be displayed.

SUMMARY OF THE INVENTION

The present invention has been made in consideration of the aforementioned problems, and enables to provide a display apparatus and control method, which display hue differences and color difference values of respective patches as lists, and display the hue direction of the hue difference of each individual patch on a chromaticity diagram in an easy-to-understand manner.

According to the present invention, the foregoing problem is solved by providing a color difference display method comprising the steps of:

inputting data associated with spectral reflectances of respective patches on first and second measurement charts which record a plurality of patches;

calculating a hue difference between corresponding patches at identical positions on the first and second measurement charts based on the data input in the inputting step;

specifying a color determined by the hue difference calculated in the calculating step; and displaying, for each patch, the hue difference calculated in the calculating step based on the color specified in the specifying step.

According to the present invention, the foregoing problem is also solved by providing a color evaluation apparatus comprising:

an input unit adapted to input data associated with spectral reflectances of respective patches on first and second measurement charts which record a plurality of patches;

a calculation unit adapted to calculate a hue difference between corresponding patches at identical positions on the first and second measurement charts based on the data input by the input unit;

a specifying unit adapted to specify a color determined by the hue difference calculated by the calculation unit; and a display unit adapted to display, for each patch, the hue difference calculated by the calculation unit based on the color specified by the specifying unit.

According to the present invention, the foregoing problem is also solved by providing a computer-readable storage medium storing a control program which makes a computer execute a color difference display method, the method comprising the steps of:

inputting data associated with spectral reflectances of respective patches on first and second measurement charts which record a plurality of patches;

calculating a hue difference between corresponding patches at identical positions on the first and second measurement charts based on the data input in the inputting step;

specifying a color determined by the hue difference calculated in the calculating step; and displaying, for each patch, the hue difference calculated in the calculating step based on the color specified in the specifying step.

Further features of the present invention will become apparent from the following description of exemplary embodiments with reference to the attached drawings.

BRIEF DESCRIPTION OF THE DRAWINGS

FIG. 4 is a table showing information included in calorimetric data according to the embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A color evaluation apparatus according to the present invention performs calorimetric analyses of patches respectively output from different devices, and calculates and outputs hue differences and color differences from their calorimetric results. Ideally, the color difference is 0. Note that patches are the objects to be measured, which are prepared to evaluate color differences. Upon calorimetric analysis, two printed materials on which a plurality of patches are printed by different devices are used. Note that the two printed materials have the same layout of printed patches. That is, the different devices use the same original image data used to form patches.

Figure 1:
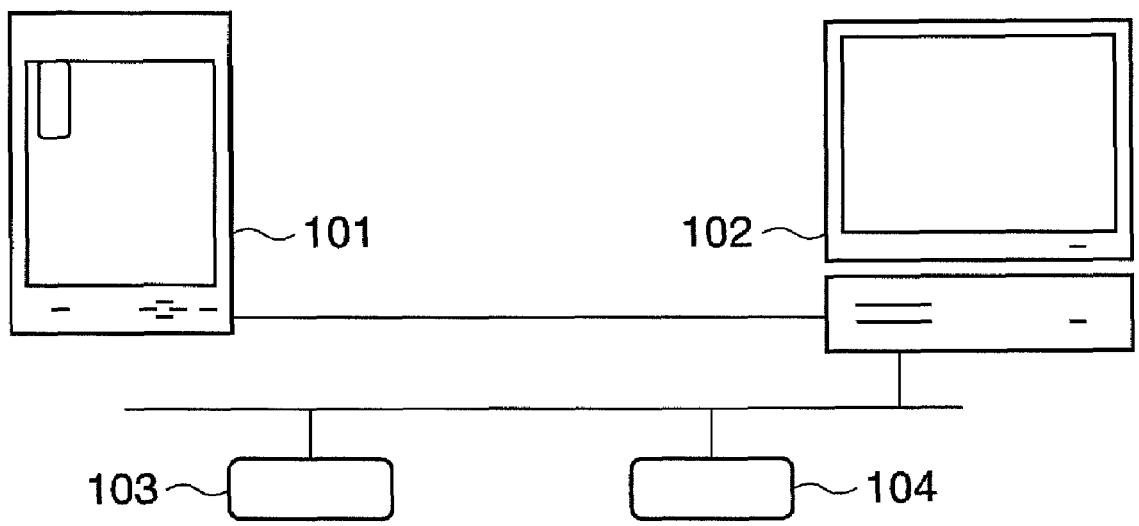
FIG. 1 is a diagram showing the system arrangement upon calorimetric analysis according to one embodiment of the present invention.

FIG. 1 shows the system arrangement upon calorimetric analysis according to this embodiment. As an example of an image output apparatus according to this embodiment, a printer is adopted. However, an image output apparatus according to the present invention may comprise a printer, facsimile, color monitor, or the like, which handles digital color images.

The system arrangement according to this embodiment includes a calorimeter 101, color evaluation apparatus (display apparatus) 102, printers 103 and 104, and interface 105. The calorimeter 101 measures the spectral reflectance characteristics such as densities, absolute chromaticities, and the like of objects to be measured. The calorimeter 101 optically measures the colors of a printed material to be measured upon reception of an instruction from the color evaluation apparatus 102, and transmits calorimetric data as measurement results to the color evaluation apparatus 102. The colorimetric data include tristimulus values (X (red), Y (green), and Z (blue), or density or LCH values (L (brightness), C (chroma), and H (hue)) of an XYZ color system, values (L* (brightness), a* (red-green axis), and b* (yellow-blue axis)) of an L*a*b* color system, and the like.

Note that the color evaluation according to the present invention uses the L*a*b* color system. Therefore, the aforementioned hue difference includes Δa* and Δb*, and the color difference ΔE is calculated by:

$$\Delta E = \sqrt{((\Delta L^*)2 + (\Delta a^*)2 + (\Delta b^*)2)}$$

As the color difference formula used to calculate ΔE, the CIE (Commission Internationale de l'Eclairage) specifies three calculation methods, i.e., ΔE, ΔE94, and ΔE00, which were respectively formulated in 1976, 1994, and 2000. According to this embodiment, an operator can select one arbitrary calculation method from ΔE. That is, the color difference is calculated by the calculation method corresponding to ΔE selected by the operator.

The color evaluation apparatus 102 determines and outputs the hue differences and color difference values between patches output from the printers 103 and 104. The color evaluation apparatus 102 issues a colorimetric instruction to the calorimeter 101, and determines-hue differences and color differences between reference data which are measured in advance by the colorimeter 101 and are stored in itself, and calorimetric data. Of course, as reference data, calorimetric data of an arbitrary printer may be adopted.

The printers 103 and 104 output a plurality of patches, as described above, and then undergo ink and toner adjustment based on their output results. Note that the printers 103 and 104 print respective patches using the same image data. More specifically, in image data used by both the printers, respective pieces of image information such as CMYK (cyan, magenta, yellow, and black), ROB (red, green, and blue), and the like are equal to each other.

Even when a plurality of different devices (e.g., the printers 103 and 104) use identical image data, identical output results are not always obtained. This is because these devices may often have different color reproducibilities. Hence, this embodiment measures the output results from the different devices using the calorimeter 101, and determines and outputs the hue differences and color differences based on the calorimetric results. These outputs allow the operator to recognize individual differences. For example, when the operator adjusts the devices based on the results of the hue differences and color differences, the individual differences of the devices can be reduced.

This embodiment compares the color differences between patches output from the printers 103 and 104 based on identical device color data. Note that the printers 103 and 104 are connected via an interface 105. However, the system arrangement according to this embodiment does not always require connection via the interface 105, and may use patches output from external printers or calorimetric data obtained by an external calorimeter as objects to be measured.

Figure 2:
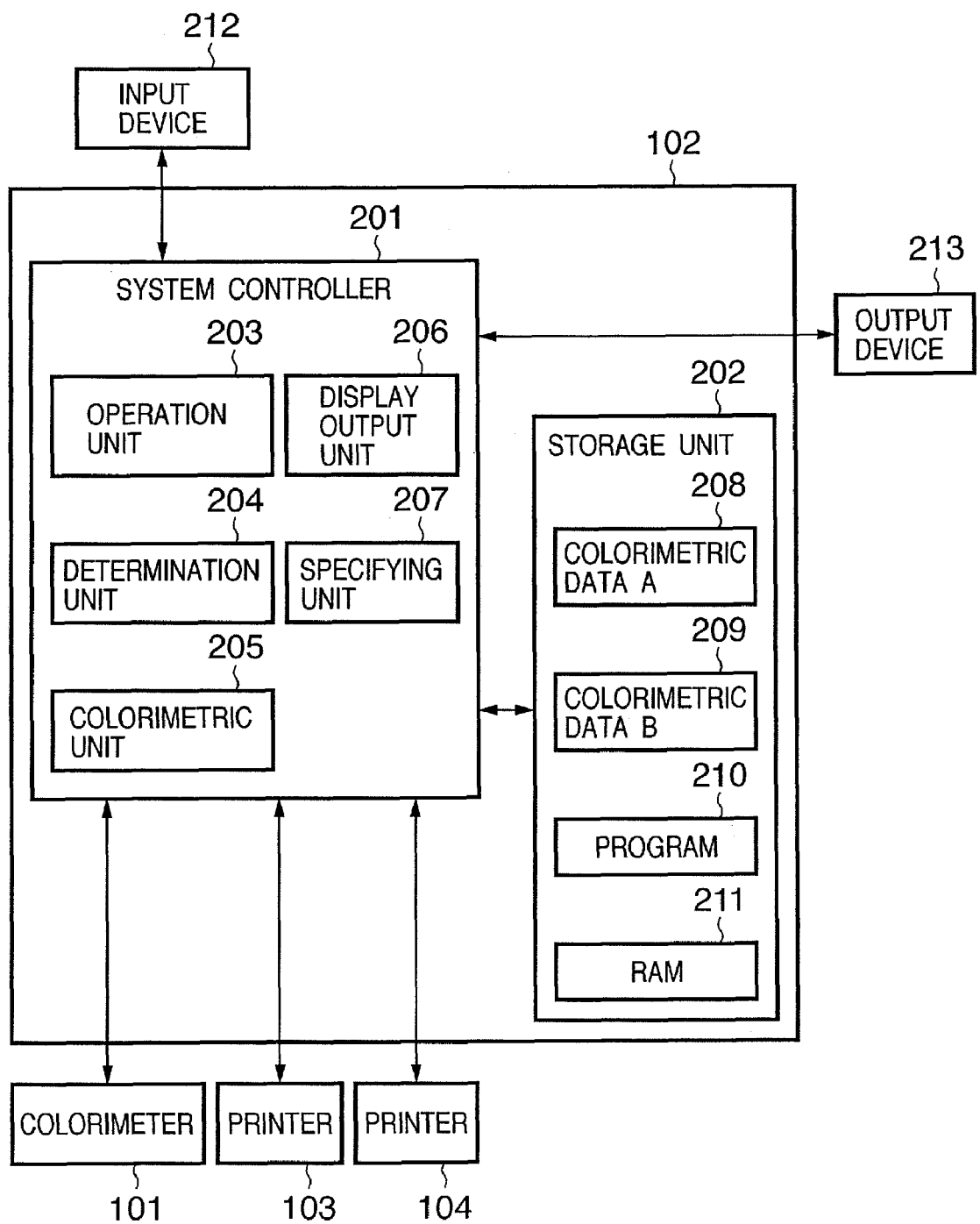
FIG. 2 is a block diagram showing a schematic arrangement of a color evaluation apparatus according to the embodiment of the present invention.

FIG. 2 is a block diagram showing a schematic arrangement of the color evaluation apparatus according to this embodiment. Note that only principal parts associated with the present invention will be described hereinafter.

The color evaluation apparatus 102 includes a system controller 201 and storage unit 202. Note that the calorimeter 101, the printers 103 and 104, an input device 212, and a display device 213 are connected to the color evaluation apparatus 102. The system controller 201 includes an operation unit 203, determination unit 204, calorimetric unit 205, display output unit 206, and specifying unit 207. The storage unit 202 includes calorimetric data A 208 of patches printed by the printer 103, and calorimetric data B 209 of patches printed by the printer 104. Furthermore, the storage unit 202 includes a program 210 used to control the color evaluation apparatus 102 of this embodiment, and a RAM 211. The RAM 211 extracts data used in calculations of the system controller 201 from the calorimetric data A 208 and data B 209 and temporarily stores them.

The calorimetric unit 205 measures the printed materials printed by the printers 103 and 104 using the calorimeter 101, and stores the colorimetric data in the storage unit 202. The determination unit 204 determines the hue difference and color difference values of the patches printed by the different devices using the calorimetric data A 208 and data B 209. Note that the system controller 201 may determine, using the determination unit, the hue difference and color difference values based on the calorimetric data measured using the calorimeter 101 and reference data pre-stored in the storage unit 202, and may store the determination results in the storage unit 202. If, for example, the colorimetric results of the patches printed by the printer 103 are used as reference data, the patches printed by the printer 104 are used as objects which are to undergo color evaluation.

The specifying unit 207 specifies one of a plurality of regions on a chromaticity diagram to which an evaluation point on the chromaticity diagram specified by a given hue difference (e.g., Δa*, Δb*) determined by the determination unit 204 belongs. Specifying the region on the chromaticity diagram to which the hue differences belong is to represent a hue to which the difference between the color reproducibilities of the two printers 103 and 104 biases, and provides important information in color adjustment of the printers 103 and 104. Note that the chromaticity diagram and the region specifying method will be described later using FIG. 11.

The display output unit 206 outputs to the display device 213 a graphical object which expresses at least one of the hue differences and color differences corresponding to the positions of the patches printed by the printers 103 and 104. That is, the display output unit 206 outputs one graphical object per patch. The graphical objects have representative colors that express a hue to which the hue differences bias from the regions on the chromaticity diagram specified by the specifying unit 207. For example, when the operator selects a display mode of only hue differences, the display output unit 206 may two-dimensionally express the color evaluation results using graphical objects corresponding to respective patch positions. Also, when the operator selects a display mode of hue differences and color differences, the display output unit 206 may express the color evaluation results in a three-dimensional (3D) graph using the graphical objects corresponding to the respective patch positions.

The operation unit 203 recognizes information which is input by the operator to the color evaluation apparatus 102 via the input device 212. For example, the operation unit 203 recognizes information of the input device which is operated by the operator to select display information of the color evaluation results to be displayed. When the aforementioned 3D graph is displayed as the color evaluation results as operator's choice, the operation unit 203 recognizes information of the input device which is operated by the operator to change the viewpoint of the 3D graph. After that, the display output unit 206 changes the display contents based on the information from the operation unit 203, e.g., the selection information of the color evaluation results and the viewpoint change information of the 3D graph.

Figure 3:
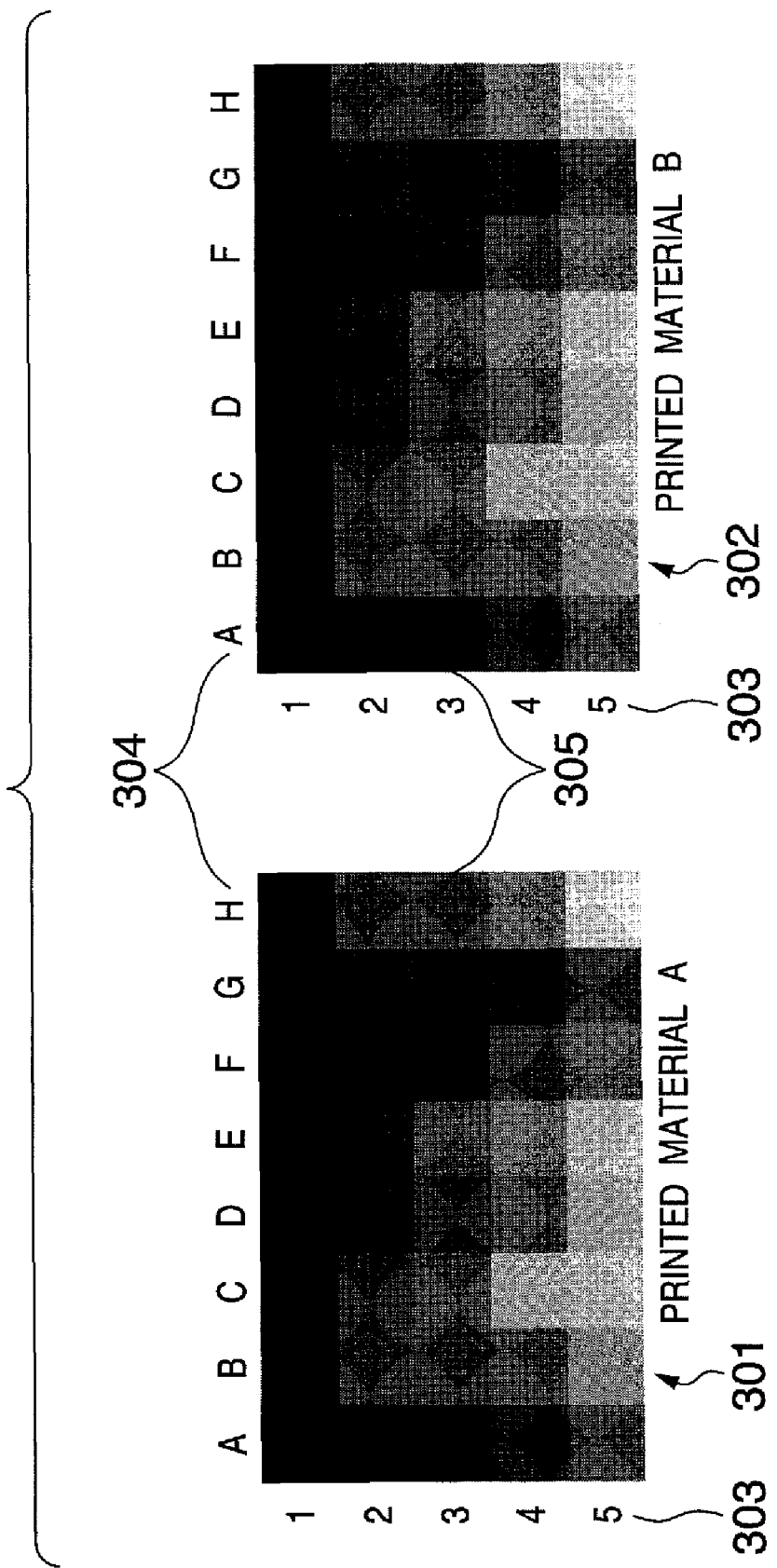
FIG. 3 shows printed materials output from different printers according to the embodiment of the present invention.

FIG. 3 shows an example of printed materials output from the different printers according to this embodiment. Note that this embodiment will explain an example in which patch patterns corresponding to the respective patches are two-dimensionally laid out and displayed. However, the display mode of the patch patterns according to the present invention is not limited to that using the two-dimensional (2D) layout.

On printed materials 301 and 302, a plurality of color patches 305 laid out in a grid pattern are printed. The color patches 305 are laid out in combinations of a row direction 303 and column direction 304. In order to identify respective rows and columns, for example, the row direction 303 may be assigned with numerical values, and the column direction 304 may be assigned with alphabets, as shown in FIG. 3. Each patch position is specified by, e.g., coordinate information like 1A. The calorimeter 101 executes calorimetric analysis for each individual patch upon calorimetric analysis. The positions of the patches printed on the printed material 301 are the same as those of the patches printed on the printed material 302.

The calorimetric unit 205 controls the calorimeter 101 to execute calorimetric analysis from the color patches 305 printed on the printed material 301. Upon completion of the colorimetric analysis, the system controller 201 stores the calorimetric data in the storage unit 202 as the calorimetric data A 208. Next, the calorimetric unit 205 executes calorimetric analysis of the color patches 305 printed on the printed material 302, and the system controller 201 stores the calorimetric data in the storage unit 202 as the calorimetric data B 209.

After that, the determination unit 204 determines the hue difference and color difference values by comparing the colorimetric data for respective corresponding patches. The determined hue difference and color difference values are stored in the storage unit 202.

FIG. 4 shows an example of information included in the calorimetric data according to this embodiment. Note that FIG. 4 shows, as an example, some pieces of principal information of those which are handled in this embodiment.

The calorimetric data include the number 401 of rows of patches, a calorimetric date & time 402, the number 403 of pieces of information of one patch, a type 404 of information of each patch, the number 405 of measured patches, and information 406 of respective patches. The number 401 of rows of patches indicates the number of rows of 2D patches printed by the printers 103 and 104. The calorimetric date & time 402 represents the date and time of calorimetric analysis.

The type 404 of information of each patch includes, e.g., a patch ID, and respective pieces of information of the RGB color system, XYZ color system, and L*a*b* color system. Note that the patch ID is identification information such as 1A, 2A, and the like used to specify the row direction 303 and column direction 304 of each patch shown in FIG. 3. That is, the patch ID can specify the position of each printed patch. The number 405 of patches represents the total number of patches. The patch information 406 includes calorimetric data for each patch.

Note that FIG. 4 shows only calorimetric data which belong to column A, and merely exemplifies some colorimetric data. Of course, there are elements in columns B to H. That is, corresponding colorimetric data for all the plurality of patches as objects to be measured are included.

Figure 5:
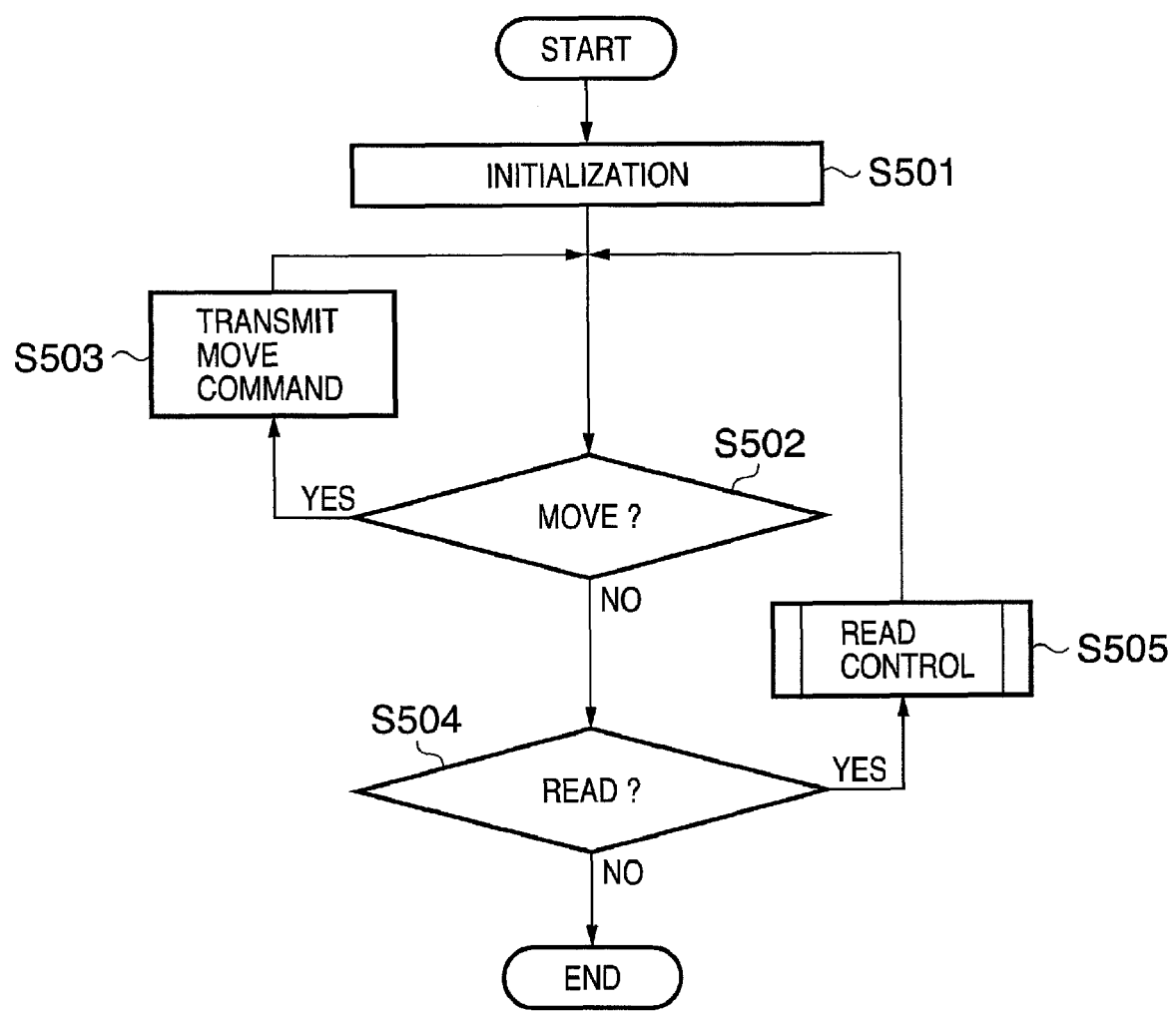
FIG. 5 is a flowchart showing calorimetric control for a colorimeter of the color evaluation apparatus according to the embodiment of the present invention.

FIG. 5 is a flowchart showing calorimetric control for the calorimeter of the color evaluation apparatus according to this embodiment. In step S501, the calorimetric unit 205 initializes the calorimeter 101. The calorimetric unit 205 determines in step S502 whether the calorimeter 101 is to be moved to a position above the patch to be measured. The calorimeter 101 is attached to, e.g., an XY stage, and is movable in the X- and Y-axis directions in accordance with a move instruction from the calorimetric unit 205. If the calorimeter 101 is to be moved, the calorimetric unit 205 transmits a move command having a destination position (coordinate data and the like) to the calorimeter 101 in step S503. After that, the calorimetric unit 205 returns the process to step S502.

On the other hand, if the calorimeter 101 is not to be moved, the calorimetric unit 205 determines in step S504 whether a patch is to be read. Note that the calorimetric unit 205 skips read control based on the position information of the calorimeter 101 if the calorimeter 101 exists on the already read patch or if the colorimeter 101 has not been moved to a position above the patch to be measured. Upon reading a patch, the colorimetric unit 205 executes the read control to make the calorimeter 101 measure the patch. The read control will be described in detail later using FIG. 6. After the read control, the colorimetric unit 205 returns the process to step S502. If the read control of the calorimeter 101 is skipped, the calorimetric unit 205 ends the processing. Note that the calorimetric unit 205 repeats the processes in steps S502 to S505 until all the patches are measured.

Figure 6:
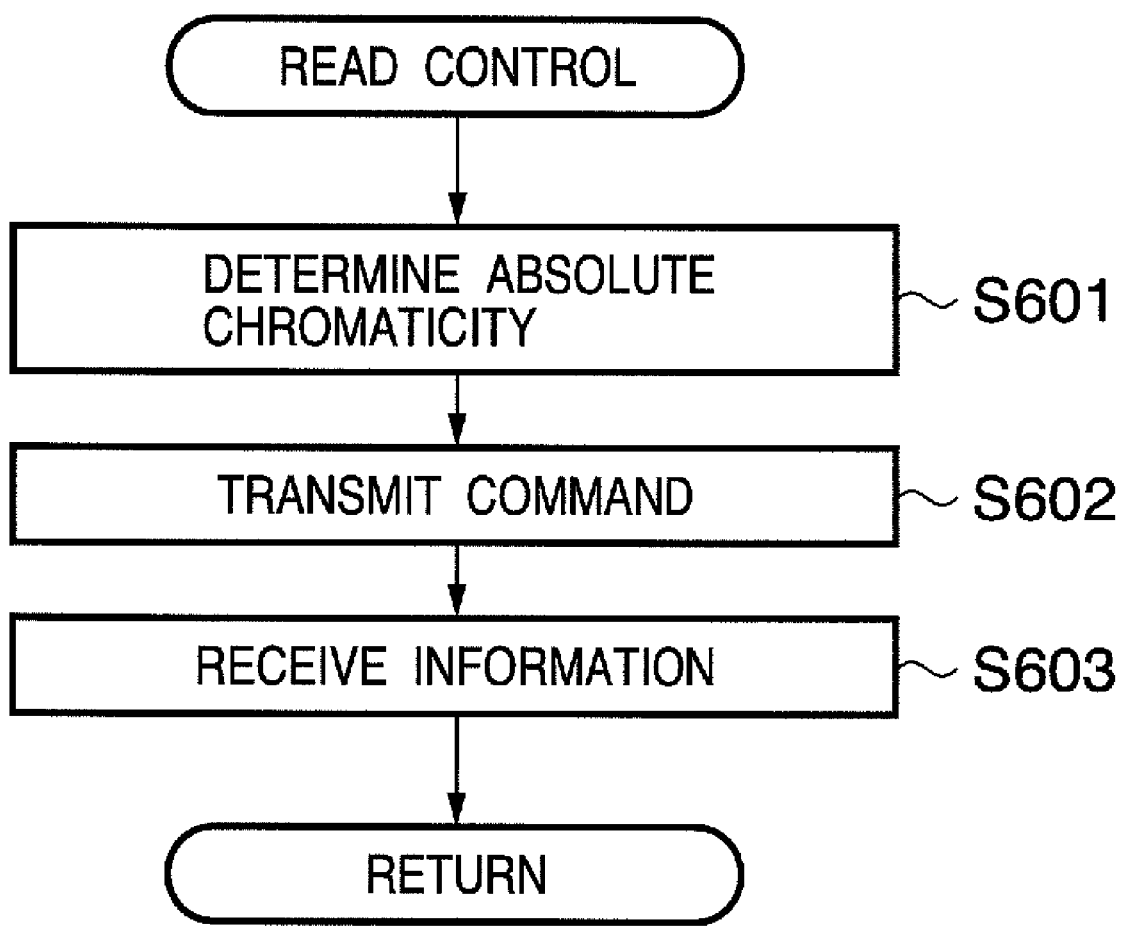
FIG. 6 is a flowchart showing patch read control for the colorimeter of the color evaluation apparatus according to the embodiment of the present invention.

FIG. 6 is a flowchart showing read control of patches for the calorimeter of the color evaluation apparatus according to this embodiment.

In step S601, the calorimetric unit 205 determines an absolute chromaticity to be received from the calorimeter 101 of a plurality of absolute chromaticities. In step S602, the calorimetric unit 205 transmits a command to read the determined absolute chromaticity to the calorimeter 101. In step S603, the calorimetric unit 205 receives calorimetric data read from each patch from the calorimeter 101, and ends the read control. After completion of the read control, the calorimetric unit 205 may store the calorimetric data received from the calorimeter 101 in the storage unit 202. The calorimetric data stored in the storage unit 202 serves as reference data upon calorimetric analysis of the patch to be compared. Note that the same read control applies to calorimetric analysis of the patch to be compared.

Figure 7:
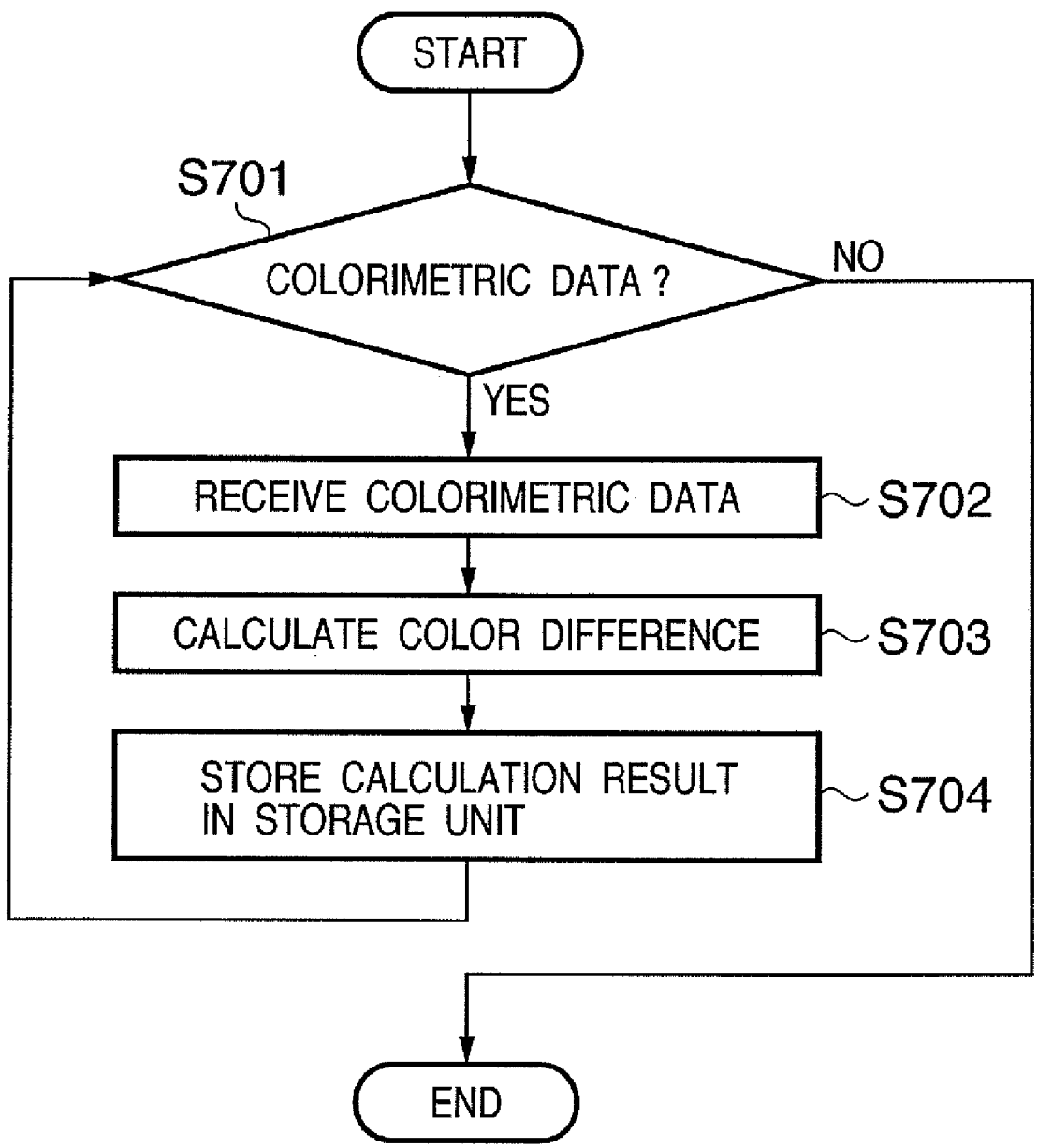
FIG. 7 is a flowchart showing control for determining color difference values by the color evaluation apparatus according to the embodiment of the present invention.

FIG. 7 is a flowchart showing control for determining the hue difference and color difference values by the color evaluation apparatus according to this embodiment. This embodiment will explain control of the determination unit 204 that determines color difference values. However, this control may be executed in the calorimetric control described using FIG. 6.

The determination unit 204 determines in step S701 whether there is calorimetric data to be received from the calorimeter 101. For example, the determination unit 204 executes this determining processing based on information (e.g., a status flag indicating calorimetric completion/incompletion of the calorimeter 101 or the like) from the calorimetric unit 205. In this case, the determination unit 204 may directly inquire the calorimeter 101 of the presence/absence of calorimetric data. As a result of determining, if there is calorimetric data to be received, the process advances to step S702, and the determination unit 204 receives colorimetric data from the calorimeter 101. On the other hand, if there is no data to be received, the determination unit 204 ends the determination control of the hue difference and color difference values.

In step S703, the determination unit 204 reads out reference data which is measured in the calorimetric control processing shown in FIG. 5 and is pre-stored in the storage unit 202. Furthermore, the determination unit 204 determines hue difference and color difference values by comparing the calorimetric data to be compared and corresponding calorimetric data read out from the storage unit 202. Finally, in step S704 the determination unit 204 stores the determined hue difference and color difference values, and the corresponding patch position in the storage unit 202. The determination unit 204 repeats steps S701 to S704 until it determines the hue difference and color difference values of all the patches, and ends the processing if no colorimetric data to be received remains.

Figure 8:
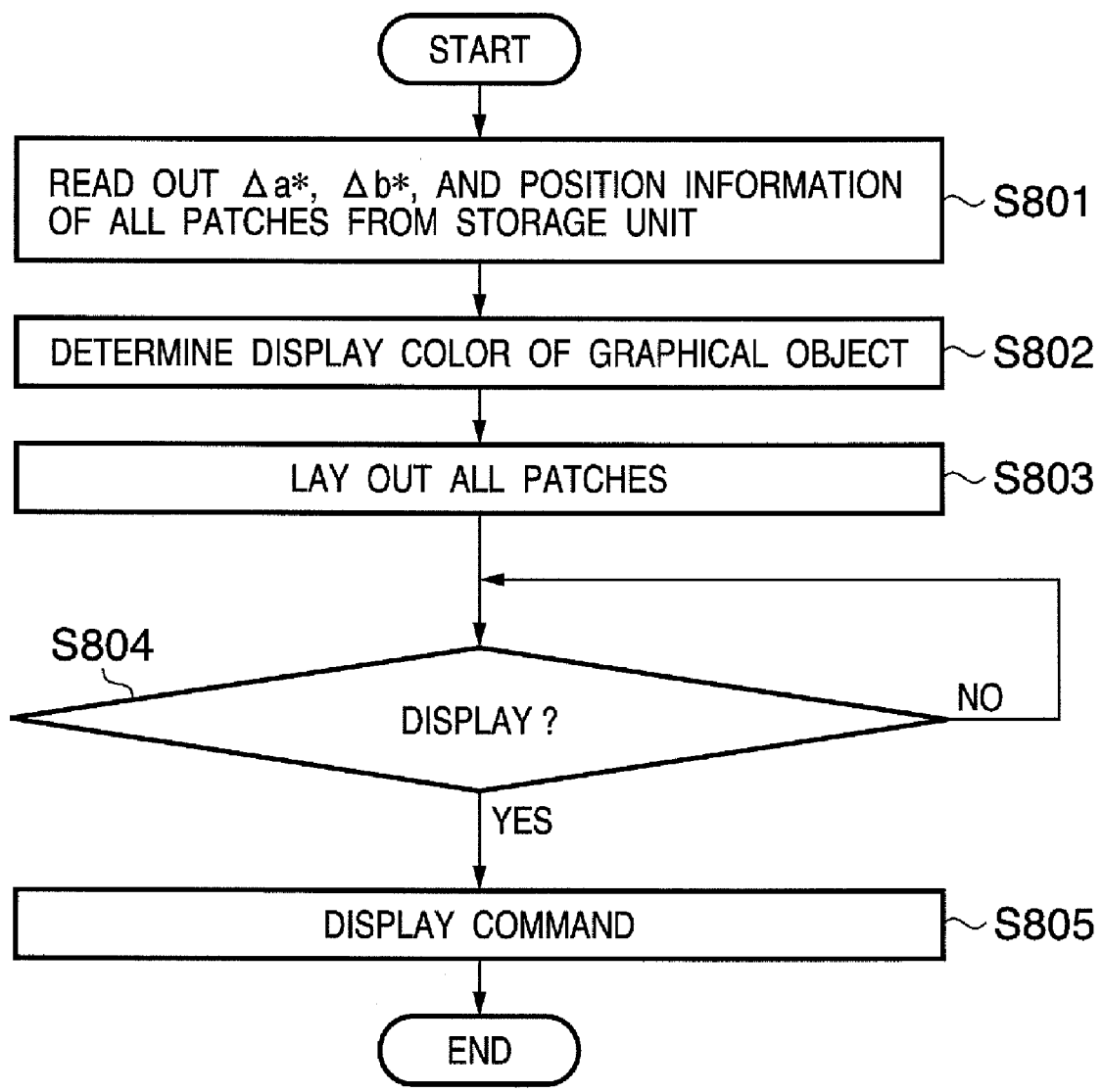
FIG. 8 is a flowchart showing control for displaying calorimetric results according to the embodiment of the present invention.

FIG. 8 is a flowchart showing control for displaying the calorimetric results according to this embodiment. In step S801, the specifying unit 207 reads out the positions and hue difference values of respective patches from the storage unit 202. In step S802, the specifying unit 207 determines display colors of graphical objects based on the readout hue differences. The specifying unit 207 specifies a region to which an evaluation point on the chromaticity diagram specified based on the hue differences belongs. After that, the specifying unit 207 may determine a representative color of the specified region. The color evaluation apparatus 102 may store the representative colors corresponding to the respective regions in the storage unit 202 in advance. Furthermore, in step S803 the display output unit 206 lays out corresponding graphical objects for all the patches.

In step S804, the operation unit 203 monitors the input device 212 until the operator inputs an output instruction of the color evaluation results. According to this embodiment, when the operator selects a display mode, the operation unit 203 may recognize that he or she inputs the output instruction. Also, in this embodiment, the operator can select one of a display mode in which graphical objects are two-dimensionally laid out to present the color differences of respective patches, and a display mode of a 3D graph expressed using graphical objects to present the hue differences and color differences of respective patches.

If the operator selects the display mode, the display output unit 206 transmits a display command corresponding to the selected display mode to the display device 213 in step S805. That is, if the operator selects the display mode of only the hue differences, the display output unit 206 transmits a display command including the display positions and display colors of the graphical objects. On the other hand, if the operator selects the display mode of the hue differences and color differences, the display output unit 206 transmits a display command including the display positions and display colors of the graphical objects and the color difference values of the respective patches. After that, the display device 213 displays the color evaluation results based on the received information.

Figure 9:
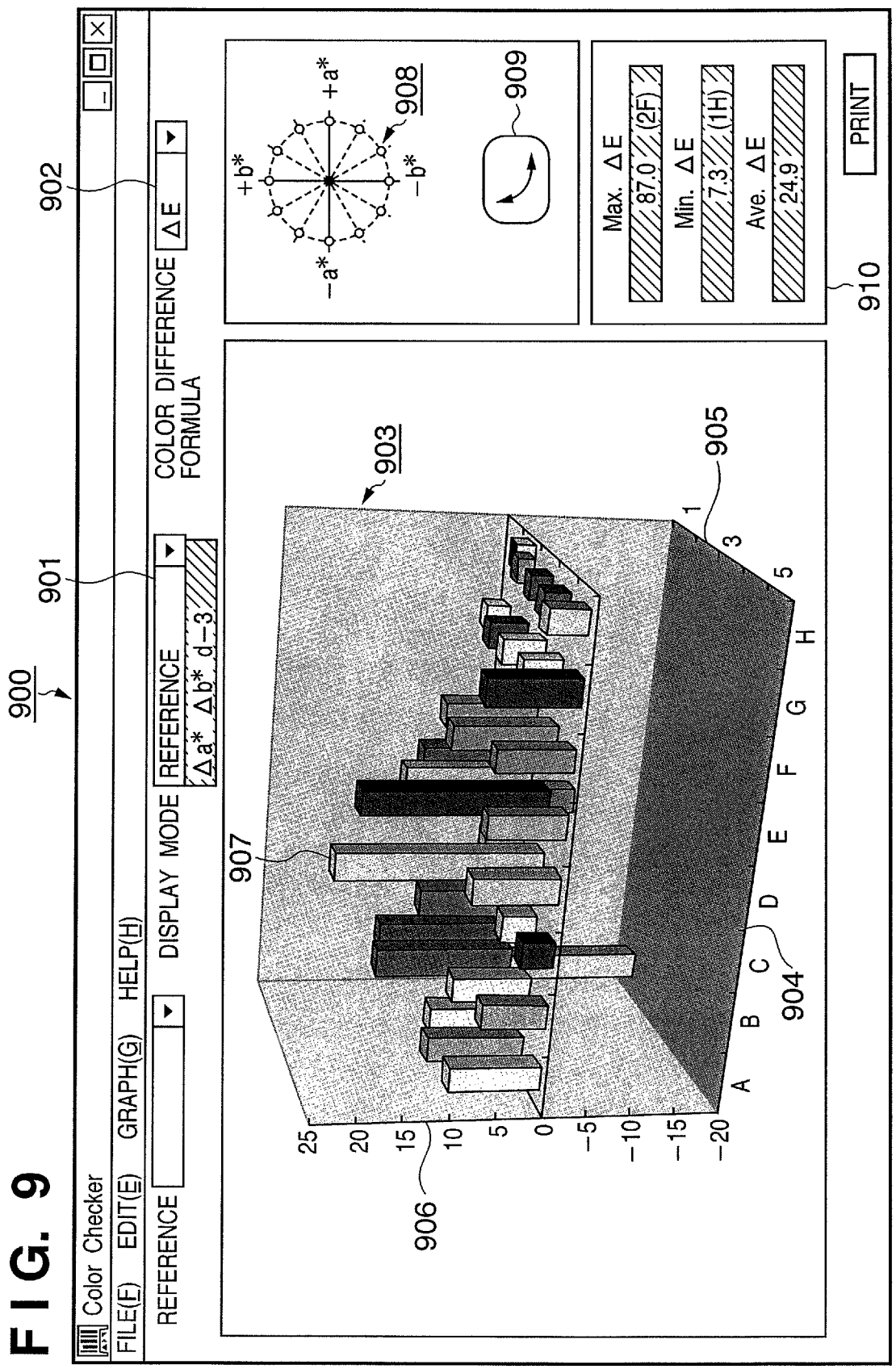
FIG. 9 shows the overall display window using a three-dimensional (3D) graph according to the embodiment of the present invention.

FIG. 9 shows the overall display window using the 3D graph according to this embodiment. As shown in FIG. 9, this color evaluation apparatus displays color-coded graphical objects 907. Respective colors express hue biases corresponding to the hue differences determined by the determination unit 204.

A display window 900 includes a pull-down menu 901 used to select the display mode, a pull-down menu 902 used to select a color difference formula, a color evaluation chart 903, a color guide chart 908, a rotation button 909, and a display window 910. When the operator selects, e.g., "$\Delta a^*$, $\Delta b^*$, d-3" as the display mode (i.e., when the operator selects the display mode of the hue differences and color differences), as shown in FIG. 9, a 3D graph is displayed as the color evaluation chart 903. In this case, as the color evaluation chart 903, the 3D graph, which has three axes, i.e., an x-axis 904, y-axis 905, and z-axis 906, displays the graphical objects 907. The x-axis 904 and y-axis 905 correspond to the positions of respective patches, when 5 (rows)×8 (columns) patches undergo calorimetric analysis, as shown in FIG. 3. More specifically, the x-axis 904 corresponds to the column direction 304 of the patches, and the y-axis 905 corresponds to the row direction 303 of the patches. For example, a graphical object 907 of a patch located at the position "2B" on the printed material is displayed at a position corresponding to "2B" on the color evaluation chart 903. In this way, the relative positional relationship of the patches on the printed material is also maintained on the color evaluation chart 903. The z-axis 906 corresponds to the color difference value $\Delta E$. The graphical objects 907 displayed at the respective patch positions are displayed to have representative colors which express hue biases at the corresponding hue differences. Note that the z-axis 906 can express the directions (+, −) of the color difference values.

The operation unit 203 specifies the display mode of the color evaluation results selected from the pull-down menu 901 using the input device 212. The display mode includes a display mode which shows only the hue differences, a display mode which shows the hue differences and color differences, and the like. When the operator selects the display mode based on the color difference formula from the pull-down menu 902, the determination unit 204 determines the color difference values according to the selected color difference formula $\Delta E$, $\Delta E94$, or $\Delta E00$. The color guide chart 908 shows representative hues on the chromaticity diagram. The rotation button 909 is laid out to rotate the 3D graph. The operator can change the viewpoint of the 3D graph by clicking the rotation button 909 and dragging a pointer in correspondence with the displayed 3D graph. That is, the display output unit 206 changes the display contents of the 3D graph according to the operator's operation. The display window 910 shows the maximum value, minimum value, and average value of the color difference values of respective patches.

Figure 10:
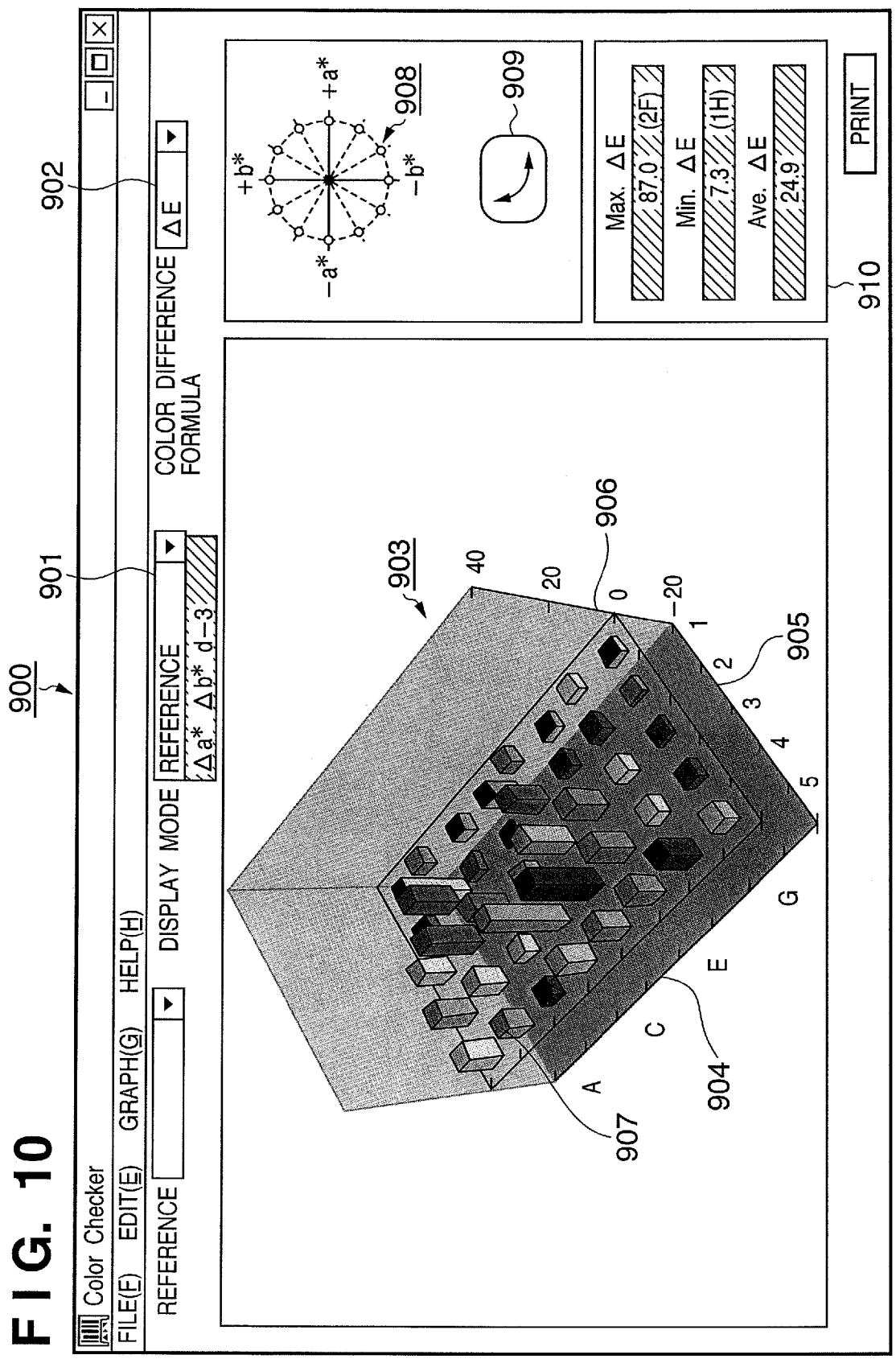
FIG. 10 shows a 3D graph, the viewpoint of which has been changed by an operator according to the embodiment of the present invention.

FIG. 10 shows the 3D graph, the viewpoint of which has been changed by the operator according to this embodiment. When the viewpoint of the color evaluation chart 903 expressed by the 3D graph remains fixed, the operator cannot see some graphical objects 907. For example, on the color evaluation chart 903 in FIG. 9, graphical objects 907 displayed at positions "1A" and "1B" are not easy for the operator to see. To solve this problem, when the operator drags the pointer using the input device 212 (e.g., a mouse), the display output unit 206 changes the viewpoint of the 3D graph. With this function, the operator can easily recognize the overall graph.

Figure 11:
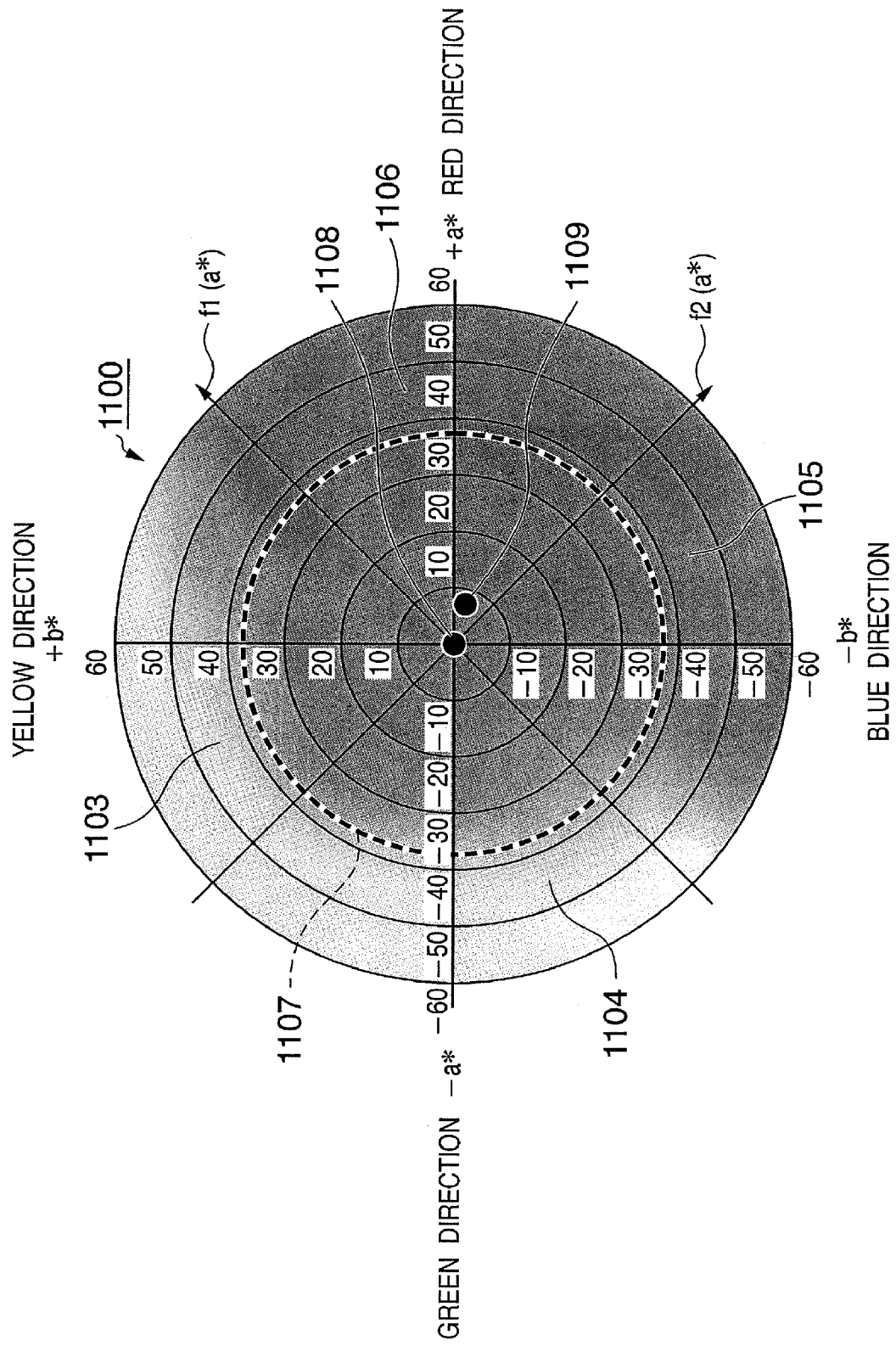
FIG. 11 shows a method of determining the colors of graphical objects according to the embodiment of the present invention.

FIG. 11 shows the method of determining colors of the graphical objects according to this embodiment. In this embodiment, the method will be explained taking a chromaticity diagram of the L*a*b* color system as an example. Note that the present invention can adopt chromaticity diagrams of other color systems.

A chromaticity diagram 1100 expresses an a*b* plane of the L*a*b* color system, the abscissa plots a*, and the ordinate plots b* to express the following chromaticities: +a*, a red direction; −a*, green direction; +b*, a yellow direction; and −b*, a blue direction. Also, the chromaticity diagram 1100 represents a change in hue along its outer circumference, and represents chroma by the distance from a central point 1108.

The color evaluation apparatus 102 according to this embodiment specifies a hue to which the hue differences of the patches printed by the printers 103 and 104 bias. For this purpose, the specifying unit 207 determines a region on the chromaticity diagram 1100 to which a point 1109 (to be referred to as an evaluation point hereinafter) as a plot of the hue difference ($\Delta a^*$, $\Delta b^*$) on the chromaticity diagram 1100 belongs. After that, the specifying unit 207 determines a representative color of the specified region, and uses it as a graphical object 907 upon outputting the color evaluation results.

However, when the color at the position of the evaluation point 1109 is used as a representative color intact, the human visual sense may perceive it as gray-based color. The hue difference often assumes a small value ranging from about 1.0 to 2.0 in general. Such values fall within a dotted range 1107 on the chromaticity diagram 1100, and the human visual sense cannot sufficiently identify a hue. For this reason, the operator cannot immediately determine a hue to which the color differences bias.

Therefore, the color evaluation apparatus 102 must determine representative colors of the color differences to make the operator easily identify a hue to which the color differences bias. Note that it is important that the operator can recognize a bias tendency of colors. For this reason, information indicating colors on the chromaticity diagram 1100 corresponding to the color differences is not important. Therefore, it is effective to express the graphical objects 907 using the representative colors.

As the method of determining a representative color, the specifying unit 207 specifies a region on the chromaticity diagram 1100 to which the evaluation point 1109 belongs. As an example, a method of specifying a region by dividing the chromaticity diagram 1100 into four regions will be described. The regions are equally divided by straight lines which pass through the central point 1108 of the a*b* plane on the chromaticity diagram 1100. For example, if the a*b* plane is given by b*=f(a*), straight lines which divide the a*b* plane into four regions include a first straight line f1(a*) and second straight line f2(a*), as shown in FIG. 11. Note that these straight lines divide the regions according to the following conditions. Furthermore, the specifying unit 207 specifies one of the divided regions to which the evaluation point 1109 belongs. If f1(a*)≦b* and f2(a*)≦b*, the evaluation point 1109 belongs to a first region 1103; if f1(a*)>b* and f2(a*)≦b*, it belongs to a second region 1104; if f1(a*)>b* and f2(a*)>b*, it belongs to a third region 1105; and if f1(a*)≦b* and f2(a*)>b*, it belongs to a fourth region 1106. The storage unit 202 desirably pre-stores the correspondence between the regions and representative colors. In this case, the representative color corresponds to arbitrary color outside the dotted range 1107 on the chromaticity diagram 1100 in the specified region. The dotted region 1107 indicates the boundaries of colors that the human visual sense can identify, as described above. For example, when the evaluation point 1109 is plotted on the first region 1103, the representative color is yellow. When $\Delta a^*$ and $\Delta b^*$ values are zero, the representative color is black.

As the representative color determination method, a method of drawing a straight line which passes through the evaluation point from the central point 1108, and using arbitrary color outside the dotted region 1107 on that straight line as a representative color may be adopted. With this method, the operator can recognize in more detail the hue to which the color difference biases. Furthermore, the present invention is not limited to the method using the chromaticity diagram. For example, the color evaluation apparatus may have a table that represents the relationship between the color differences and colors to be displayed, and may specify the color to be displayed using the table.

Figure 12:
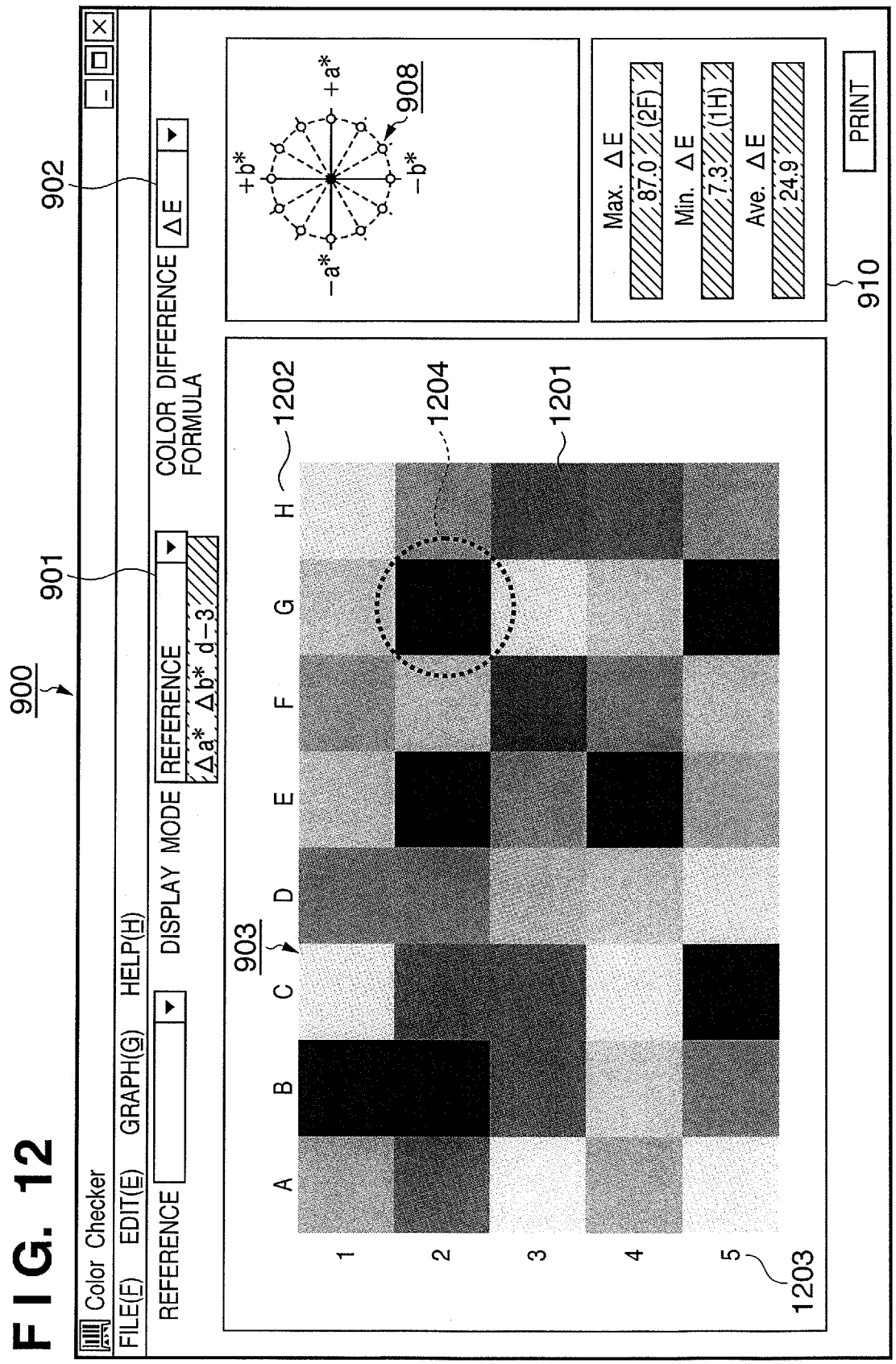
FIG. 12 shows the overall display window on which graphical objects are two-dimensionally arranged according to the embodiment of the present invention.

FIG. 12 shows the overall output window on which the graphical objects are two-dimensionally laid out according to this embodiment. The color evaluation results are two-dimensionally displayed when the operator need not recognize the $\Delta E$ values.

According to the color evaluation chart 903 on the display window 900, the display output unit 206 outputs graphical objects 1201 on a column direction 1202 and row direction 1203 to express the positions of the patches printed by the printers 103 and 104. Each graphical object 1201 represents the hue difference by color as in the 3D graph shown in FIG. 9. The display output unit 206 may display a marking 1204 on the graphical object 1201 having the hue difference value larger than a predetermined value. This marking 1204 is effective to indicate the degree of hue biases, and is effective for the operator to easily recognize a patch having a large hue difference. The form of the marking 1204 is not particularly limited as long as the operator can easily recognize the marking, although the marking 1204 is expressed by a dotted circle in FIG. 12. Alternatively, the corresponding graphical object 1201 may flicker.

As described above, the display method according to this embodiment includes a specifying step of specifying a color specified by a hue difference calculated from first and second values associated with spectral reflectance characteristics. The control method includes a display step of displaying the color specified in the specifying step as a graphical object. Therefore, the display method of the present invention allows the operator to easily understand, based on the colors of the graphical objects, the hue to which the hue differences of respective patches bias. In the color adjustment of devices after color evaluation, the operator makes color adjustment according to the hue biases. That is, expressing the hue biases based on the hue differences as the color evaluation results provides information that directly leads to color adjustment, thus expecting efficient color evaluation.

The present invention is not limited to the above embodiment and allows various modifications. For example, the specifying step in the above embodiment may include a step of specifying a color that can be reproduced on the chromaticity diagram by applying the hue difference to the chromaticity diagram. Hence, the visibility of the hue biases based on the hue differences can improve.

The specifying step of the above embodiment may include a step of specifying a visually identifiable representative color on the chromaticity diagram. The operator can easily determine in detail based on the colors of the graphical objects the direction in which the hue bias inclines. Therefore, the visibility of the hue biases based on the hue differences can further improve.

The display step of the above embodiment may include a step of displaying the color difference calculated from the first and second values associated with the spectral reflectance characteristics as a graphical object. In this way, the display step can display the color evaluation results for respective patches in correspondence with the position of the patches printed by the image output apparatuses. Therefore, the operator can easily recognize the relationship of the color evaluation results among the patches.

The display step of the above embodiment may include a step of displaying a 3D graph as graphical objects. In this way, the display step can simultaneously display the hue differences and color differences. Therefore, the operator can recognize the color evaluation results from various aspects. Hence, efficient color adjustment can be expected.

Furthermore, the display step of the above embodiment may include a step of highlighting a graphical object when that graphical object has a hue difference larger than a predetermined value. In this manner, the visibility of the color evaluation results can improve, thus allowing efficient color evaluation.

Other Embodiments

Various embodiments have been explained. However, the present invention can be applied to either a system constituted by a plurality of devices, or an apparatus consisting of a single device. For example, the present invention may be applied to a printer, facsimile, PC, a computer including a server and client, and the like.

The present invention can also be achieved by directly or remotely supplying a program of software that implements the functions of the aforementioned embodiments to a system or apparatus, and reading out and executing the supplied program code by a computer of that system or apparatus.

Therefore, the program code itself installed in a computer to implement the functions and processing of the present invention using the computer implements the present invention. That is, the present invention includes the computer program itself for implementing the functions and processing of the present invention.

In this case, the form of program is not particularly limited, and an object code, a program to be executed by an interpreter, script data to be supplied to an OS, and the like may be used as long as they have the program function.

As a recording medium for supplying the program, for example, a flexible disk, hard disk, optical disk, magneto-optical disk, MO, CD-ROM, CD-R, CD-RW, and the like may be used. Also, as the recording medium, a magnetic tape, nonvolatile memory card, ROM, DVD (DVD-ROM, DVD-R), and the like may be used.

The program may also be downloaded from a home page on the Internet using a browser running on a client computer. That is, the computer program itself of the present invention or a compressed file including an automatic installation function may be downloaded onto a recording medium such as a hard disk or the like. The program code which forms the program of the present invention may be segmented into a plurality of files, and the respective files may be downloaded from different home pages. That is, a WWW server which makes a plurality of users download the program file for implementing the functions and processing of the present invention using a computer may also become a building component of the present invention.

A storage medium such as a CD-ROM or the like, which stores the encrypted program of the present invention may be distributed to users. In this case, only a user who meets predetermined conditions is allowed to download key information used to decrypt the encrypted program from a home page via the Internet, to decrypt the encrypted program using that key information, and to install the program in the computer.

The functions of the aforementioned embodiments may be implemented by executing the readout program code by the computer. Note that an OS or the like running on the computer may execute some or all of actual processes on the basis of an instruction of that program. Of course, in such case as well, the functions of the aforementioned embodiments can be implemented.

Furthermore, the program read out from the recording medium may be written in a memory equipped in a function extension board or function extension unit, which is inserted in or connected to the computer. Based on an instruction of that program, a CPU or the like equipped in the function extension board or function extension unit may execute some or all of actual processes. In this way, the functions of the aforementioned embodiments may be implemented.

The present invention can provide a color evaluation apparatus which outputs hue differences and color differences of respective patches as lists, and outputs a hue on a chromaticity diagram to which the value of a hue difference of each patch belongs in an easy-to-understand manner.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-023625, filed Jan. 31, 2006, which is hereby incorporated by reference herein in its entirety.

What is claimed is:

1. A color difference display method comprising the steps of:

inputting data associated with spectral reflectances of respective patches on first and second measurement charts which record a plurality of patches;

calculating a hue difference between corresponding patches at identical positions on the first and second measurement charts based on the data input in the inputting step;

specifying a color determined by the hue difference calculated in the calculating step; and displaying a graphical object for each patch that expresses at least the hue difference calculated in the calculating step based on the color specified in the specifying step, so that an operator can visually recognize the calculated hue difference from the graphical object, wherein the displaying step includes a step of further displaying a color difference calculated from a first value and a second value associated with the spectral reflectance characteristics as the graphical object, and wherein the displaying step includes a step of displaying a three-dimensional graph as the graphical object.

2. The color difference display method according to claim 1, wherein the specifying step includes a step of specifying a color which is to be reproduced on a chromaticity diagram by applying the hue differences to the chromaticity diagram.

3. The color difference display method according to claim 1, wherein the specifying step includes a step of specifying a visually identifiable representative color on a chromaticity diagram.

4. The color difference display method according to claim 1, wherein the displaying step includes a step of highlighting a graphical object when the calculated hue difference is larger than a predetermined value.

5. A color evaluation apparatus comprising:

an input unit adapted to input data associated with spectral reflectances of respective patches on first and second measurement charts which record a plurality of patches;

a calculation unit adapted to calculate a hue difference between corresponding patches at identical positions on the first and second measurement charts based on the data input by said input unit;

a specifying unit adapted to specify a color determined by the hue difference calculated by said calculation unit; and a display unit adapted to display a graphical object for each patch that expresses at least the hue difference calculated by said calculation unit based on the color specified by said specifying unit, so that an operator can visually recognize the calculated hue difference from the graphical object, wherein the displaying unit further displays a color difference calculated from a first value and a second value associated with the spectral reflectance characteristics as the graphical object, and wherein the displaying unit displays a three-dimensional graph as the graphical object.

6. A non-transitory computer-readable storage medium storing a control program which makes a computer execute a color difference display method, said method comprising the steps of:

inputting data associated with spectral reflectances of respective patches on first and second measurement charts which record a plurality of patches;

calculating a hue difference between corresponding patches at identical positions on the first and second measurement charts based on the data input in the inputting step;

specifying a color determined by the hue difference calculated in the calculating step; and displaying a graphical object for each patch that expresses at least the hue difference calculated in the calculating step based on the color specified in the specifying step, so that an operator can visually recognize the calculated hue difference from the graphical object, wherein the display of the graphical object includes displaying a color difference calculated from a first value and a second value associated with the spectral reflectance characteristics as the graphical object, and displaying a three-dimensional graph as the graphical object.

* * * * *